United States Patent
Jäkel

(10) Patent No.: US 7,421,208 B2
(45) Date of Patent: Sep. 2, 2008

(54) METHOD FOR CARRYING OUT INFRARED DATA TRANSMISSION

(75) Inventor: Günter Jäkel, Gollenshausen (DE)

(73) Assignee: Ruwido Austria GmbH, Neumarkt a.W. (AT)

( * ) Notice: Subject to any disclaimer, the term of this patent is extended or adjusted under 35 U.S.C. 154(b) by 0 days.

(21) Appl. No.: 10/534,078

(22) PCT Filed: Nov. 6, 2002

(86) PCT No.: PCT/AT02/00310

§ 371 (c)(1),
(2), (4) Date: Feb. 8, 2006

(87) PCT Pub. No.: WO2004/042966

PCT Pub. Date: May 21, 2004

(65) Prior Publication Data

US 2006/0159459 A1    Jul. 20, 2006

(51) Int. Cl.
*H04B 10/10* (2006.01)
*H04J 3/10* (2006.01)

(52) U.S. Cl. .................. 398/183; 308/165; 308/166; 308/167.5; 340/825.69

(58) Field of Classification Search ................ 398/112, 398/167.5, 154, 165, 166, 183; 370/442–444, 370/212–213, 337, 347; 375/295
See application file for complete search history.

(56) References Cited

U.S. PATENT DOCUMENTS 5,098,110 A    3/1992    Yang
5,122,796 A *  6/1992    Beggs et al. ................. 340/904
5,331,450 A *  7/1994    Heep et al. ..................... 398/92
5,870,381 A *  2/1999    Kawasaki et al. ........... 370/213

FOREIGN PATENT DOCUMENTS

| DE | 36 24 507 A | 1/1988 |
| EP | 0 920 891 A | 6/1999 |
| FR | 2 674 658 A | 10/1992 |
| WO | WO 00 28501 A | 5/2000 |

* cited by examiner

*Primary Examiner*—Jason Chan
*Assistant Examiner*—Danny W Leung
(74) *Attorney, Agent, or Firm*—Collard & Roe, P.C

(57) ABSTRACT

A method is described for infrared data transmission between several transmitter units (S1 to S4) and a common receiver station (2), with the individual transmitter units (S1 to S4) transmitting the data to be transmitted in a blockwise manner to the receiver station (2) in a time interval with respect to each other. In order to provide advantageous preconditions for the method it is proposed that the respective data blocks (d1 to d4) to be transmitted are transmitted repeatedly in a transmission interval (T) of the same length for all transmitter units (S1 to S4) according to the maximum number of transmitter units (S1 to S4), with the length of the repetition intervals (i1 to i4) which differ for all transmitter units (S1 to S4) differing at least by twice the transmission time for a maximum data block size, and that the shortest repetition interval (i1) corresponds at least to the multiple of the double transmission time for a maximum data block size, which multiple corresponds to the maximum number of transmitter units (S1 to S4).

4 Claims, 2 Drawing Sheets

METHOD FOR CARRYING OUT INFRARED DATA TRANSMISSION

CROSS REFERENCE TO RELATED APPLICATIONS

Applicant claims priority under 35 U.S.C. §365 of PCT/AT2002/000310 filed Nov. 6, 2002. The international application under PCT article 21 (2) was not published in English.

1. Field of the Invention

The invention relates to a method for infrared data transmission between several transmitter units and a common receiver station, with the individual transmitter units transmitting the data to be transmitted in a blockwise manner to the receiver station in a time interval with respect to each other.

2. Description of the Prior Art

In order to control a base station such as a computer, audio or video systems, gaming consoles or the like through several control devices via infrared data transmission, it needs to be ensured that the data transmitted by the individual control devices, which data is transmitted in a blockwise manner, can be received by the base station in a manner so as to be unimpaired by the data transmission of other control devices. For this reason, different carrier frequencies are assigned in known infrared transmission methods to the different transmitter units of the control devices or the data blocks are transmitted by the transmitter units in time intervals successively, which each require a certain amount of effort. While in the use of different carrier frequencies it is not only necessary to have different transmitter units but also to have receiver units adjusted to the respective carrier frequencies, the time-staggered transmission of the data combined into data blocks requires a respective control of the transmitter units of the control devices from the receiver station, which on the part of the receiver station necessitates a respective transmitter unit and on the part of the transmitter units additional receiver units for the mutual time coordination of the control devices, although in many applications data merely need to be sent from the control devices to the base station.

In order to ensure a secure reception of the data sent by several control devices to a common base station without having to assign to the control devices any separate carrier frequencies or to synchronize the transmitter units of the control devices, it is finally known (DE 36 24 507 A1) to transmit the data to be transmitted repeatedly in predetermined time intervals which are chosen separately for each control device. Although this ensures the complete reception of the data for each control device, the control devices are placed at a considerable disadvantage with respective longer time intervals between the data output. For this reason it was proposed to choose the transmission pauses between the transmission pulses differently for each transmitter unit, so that for each transmitter unit a different pattern of different transmission pauses is obtained. This increases the constructional complexity for the transmitter units however. Moreover, blockwise data transmission is not possible.

SUMMARY OF THE INVENTION

The invention is thus based on the object of providing a method for infrared data transmission between several transmitter units and a common receiver station of the kind mentioned above in such a way that a secure data transmission is enabled with a low amount of effort without having to use different carrier frequencies or having to trigger the transmitter units from the common receiver station.

This object is achieved by the invention in such a way that the respective data blocks to be transmitted are transmitted repeatedly in a transmission interval of the same length for all transmitter units according to the maximum number of transmitter units, with the length of the repetition intervals which differ for all transmitter units differing at least by twice the transmission time for a maximum data block size, and that the shortest repetition interval corresponds at least to the multiple of the double transmission time for a maximum data block size, which multiple corresponds to the maximum number of transmitter units.

Since as a result of this measure the data combined into data blocks need to be transmitted several times within a predetermined transmission interval (namely in a number corresponding to the maximum number of transmitter units), it is necessary (under the precondition that the repetition intervals of the individual transmitter units differ by a predetermined minimum amount in their length), that each data block transmitted by a transmitter unit must be received at least once in its full length by the receiver station, without being influenced by data transmissions of the other transmitter units. Since as a result of a predetermined maximum data block length a time offset of two data blocks transmitted by different transmitter units up to the amount of the transmission time for one data block leads to an overlapping reception of the two data blocks in the receiver station, the minimum distance between repetition intervals of the individual transmitter units must correspond to the double transmission time for a maximum data block size. Moreover, the shortest repetition interval must not be shorter than the multiple of the double transmission time for a maximum data block size (which multiple corresponds to the maximum number of transmitter units), because otherwise the data blocks of all transmitter units cannot be transmitted with the required safety intervals according to the data block length without mutual overlapping within the shortest repetition interval. This however is a precondition for an at least single overlap-free transmission of each data block, irrespective of the respective transmission time of the transmitter units. If the data blocks each contain in the usual manner an identifier for the transmitter unit from where they were sent, a secure unilateral data transmission from the transmitter units to the receiver station is enabled in a simple manner that is independent of the respective transmission time of the transmitter units. It is necessary to observe the predetermined transmission interval between the transmission of different data blocks of a transmitter unit however.

In order to enable the control of transmitter units for infrared data transmission to a common receiver station according to the invention, the data which are to be transmitted, combined in a data block and saved to a memory of each transmitter unit, must be repeatedly read out to the transmitter unit via a control unit for transmission to the receiver station. The repetition interval is predetermined by the program depending on the number of transmitter units and the data block length, which is different for each transmitter unit because these repetition intervals must have a time grading depending on the data block length. As a result of the time elements assigned to the individual transmitter units, the repetition intervals of the individual transmitter units which are adjusted to each other with respect to their length can be predetermined without any further problems. The data to be transmitted can be read into the memory in a conventional manner by means of a reader device which can be configured in many different ways and can consist of a keyboard, mouse or a control lever.

BRIEF DESCRIPTION OF THE DRAWINGS

The method in accordance with the invention is now explained in closer detail by reference to the drawings, wherein.

DESCRIPTION OF THE PREFERRED EMBODIMENT

Figure 1:
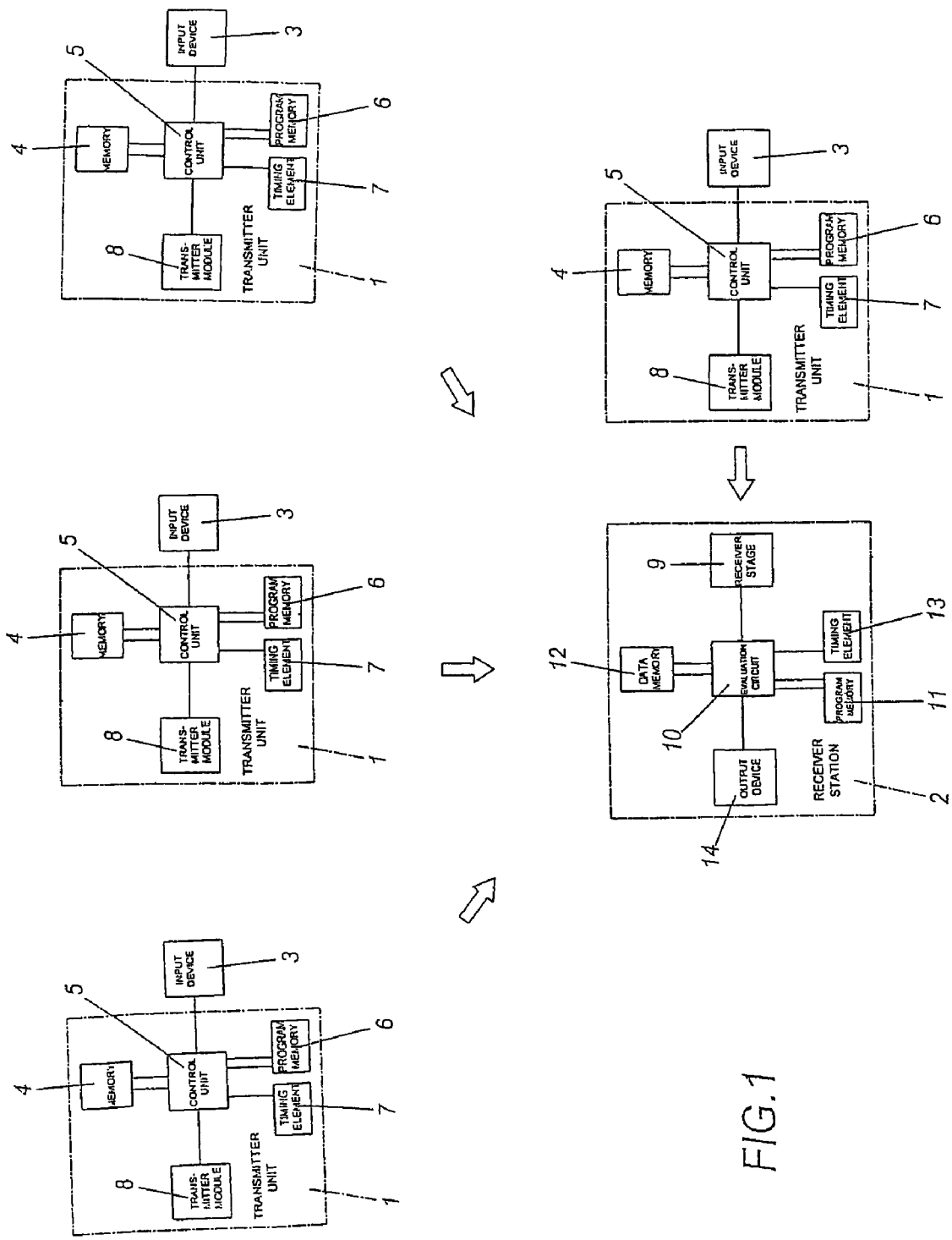
FIG. 1 shows a device in accordance with the invention for infrared data transmission between several transmitter units and a common receiver station in a simplified block diagram.
Figure 2:
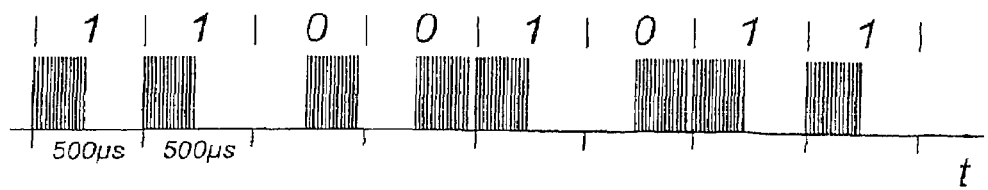
FIG. 2 shows an infrared carrier beam which is modulated according to a data block to be transmitted.

According to the embodiment of FIG. 1 which shows merely one of several receiver units 1, the data to be transmitted from the individual transmitter units 1 to a common receiver station 2 are read via an input device 3 into a memory 4, which occurs by means of a control unit 5 which on its part is connected on the one hand to a program memory 6 and on the other hand to a timing element 7. This control unit 5 is used for combining the stored data into a data block depending on the respectively predetermined program and forwarded to a transmitter module 8 for transmission to the receiver station 2. An infrared carrier is modulated in this transmitter module 8 according to the data block to be transmitted, as is indicated in FIG. 2 for example. FIG. 2 shows that by modulating the carrier frequency of 56 kHz for example a sequence of 8 bits with a period of 500 μs is obtained. Each bit is composed of a pulse sequence and pulse break of 250 μs each, so that a bit of a pulse sequence with a subsequent pause can be assigned a logical "1" and a bit with a pause preceding the pulse sequence can be assigned a logical "0". The individual bits of the bit sequence shown in FIG. 2 are associated with certain information to be transmitted. As a result, the first bit in the bit sequence forms a start command for example for the receiver unit 2, whereas the next two subsequent bits contain the identifier for the individual transmitter units 1, which requires two bits for four transmitter units 1. Since the data block according to FIG. 2 is transmitted not only once but several times (which occurs four times in the case of four transmitter units 1), the subsequent two bits can represent the actual repetition number, whereas the last three bits contain the actual information to be transmitted, as were entered through the input device 3. These last three bits can represent the code of a pressed button.

Figure 3:
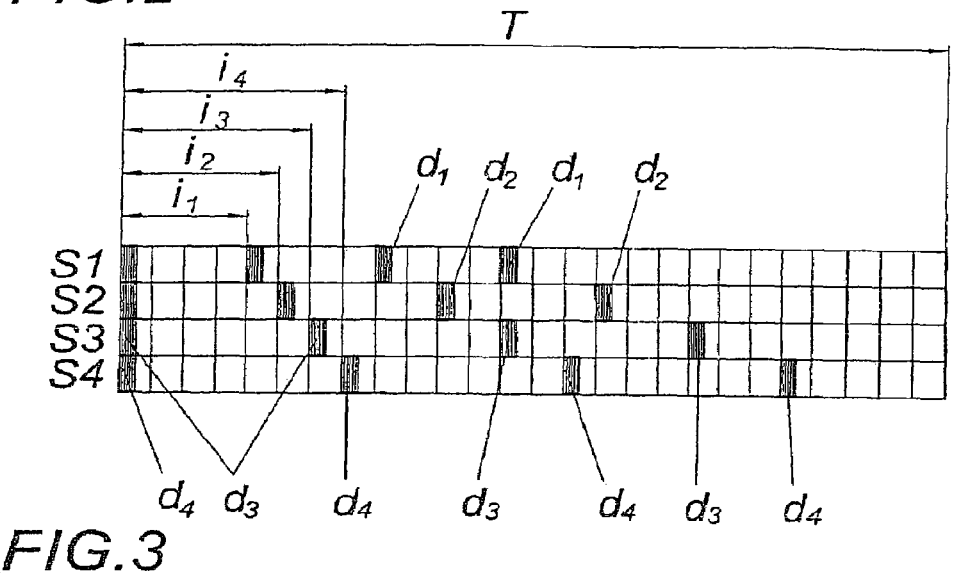
FIG. 3 shows a possible transmission protocol for four transmitter units cooperating with a common base station.
Figure 4:
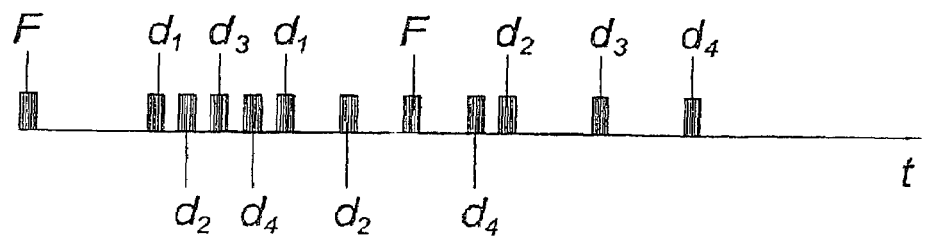
FIG. 4 shows the infrared signal received by the receiver station according to the transmission protocol according to FIG. 3.

FIG. 3 shows the time-related send protocol of four transmitter units 1 under the unfavorable assumption for the transmission that all transmitter units S1 to S4 are started simultaneously, so that the data blocks transmitted within a send interval T by the individual transmitter units S1 to S4 arrive simultaneously in the receiver station 2, leading to a signal F according to FIG. 4 which can no longer be evaluated. The data blocks d1 to d4 are not transmitted only once, but according to the number of the transmitter units (i.e. four times). The repetition intervals i1 to i4 differ in their length, namely at least by twice the transmission time of the data blocks d, to d4. The smallest repetition interval i1 corresponds at least to four times the double data block length, as is shown in FIG. 3. Under these preconditions it is ensured irrespective of the respective start time of the individual transmitter units S1 to S4 that in the predetermined transmission interval T each data block d1 to d4 is transmitted at least once completely to the receiver station 2 and without impairment by data blocks of other transmitter units. Under the assumption of FIG. 3, only two erroneous transmissions will occur in connection with the transmitted data blocks d1 to d4, as are designated in FIG. 4 with reference F.

The data blocks d1 to d4 as transmitted by the individual transmitter units 1 in the described manner are received in the receiver station 2 via a receiver stage 9 which is common to all transmitter units 1 and are supplied to an evaluation circuit 10 which is connected to a respective program memory 11 in order to allocate the arriving data blocks and to enable the deciphering of the same. This evaluation circuit 10 is connected in the usual manner again with a data memory 12 and a timing element 13 in order to secure a respective data processing. The received data can then be forwarded through an output device 14 for controlling the connected base station.

The invention claimed is:

1. Method for infrared data transmission comprising the steps of:
   (a) providing an infrared data transmission system comprising a plurality of transmitter units and a common receiver station; and
   (b) transmitting a plurality of data blocks via said plurality of transmitter units with a common carrier frequency, wherein each data block of said plurality of data blocks is repeatedly transmitted a number of times in a transmission interval from a respective transmitter unit of said plurality of transmitter units, the number of times being equal to a total number of said plurality of transmitter units, the transmission interval includes a plurality of repetition intervals for transmission of the data blocks, each repetition interval having a duration equal to the time of the respective transmitter unit that is between beginnings of two transmissions of the data block that follow one another, each repetition interval duration for the respective transmitter unit differs from every other repetition interval duration of the other transmitter units by at least twice a transmission time of a maximum data block, a shortest repetition interval of said plurality of repetition intervals corresponds at least to a multiple of double the transmission time for the maximum data block size, said multiple corresponding to the total number of said plurality of transmitter units, the transmission interval of each transmitter unit of said plurality of transmitter units is equal in duration, and said transmission interval ends after a last transmission of the data block of the transmitter unit with a longest repetition interval of said plurality of repetition interval ends plus the transmission time of a maximum data block plus the duration of the shortest repetition interval.

2. The method according to claim 1, wherein the plurality of data blocks are transmitted with a modulation of the carrier frequency of 56 kHz.

3. An infrared data transmission system comprising,
   (a) a common receiver; and
   (b) a plurality of transmitter units that repeatedly transmits data blocks of varying sizes to said common receiver along a common carrier frequency, each transmitter unit comprising,
      a memory for combining data into data blocks and capable of being read out in repetition intervals,
      a timing element, a control unit connected to said timing element for reading data blocks out of the memory, and a transmitter module for modulating the common carrier frequency, wherein each data block of said plurality of data blocks is repeatedly transmitted a number of times from a respective transmitter unit of said plurality of transmitter units to said common receiver along a transmission interval and according to a repetition interval, the number of times is equal to a total number of said plurality of transmitter units, the transmission interval includes a plurality of repetition intervals for transmission of the data blocks, each repetition interval having a duration equal to the time of the respective transmitter unit that is between beginnings of two transmissions of the data block that follow one another, said plurality of repetition intervals has at least a longest repetition interval and a shortest repetition interval, said shortest repetition interval being at least a multiple of double a transmission time for a maximum data block size and the multiple is the total number of said plurality of transmitter units, wherein each one of said plurality of transmitter units has one of said plurality of repetition intervals, each repetition interval duration differs from each other repetition interval duration of the other transmitter units by at least twice the transmission time for a maximum data block, starting from the shortest repetition interval extending step by step to a subsequent repetition interval of said plurality of repetition intervals, and a duration of the transmission interval ends after a last transmission of the data block of the transmitter unit with a longest repetition interval of said plurality of repetition interval ends plus the transmission time of a maximum data block plus the duration of the shortest repetition interval.

4. The system according to claim 3, wherein the plurality of data blocks are transmitted with a modulation of the carrier frequency of 56 kHz.

* * * * *